(12) United States Patent
Szadkowski et al.

(10) Patent No.: US 7,007,784 B2
(45) Date of Patent: Mar. 7, 2006

(54) POSITIVE SEPARATOR FOR MULTIPLE DISC CLUTCHES

(75) Inventors: Andrzej Szadkowski, Southern Pines, NC (US); Muneer Abusamra, Southern Pines, NC (US); Ronald B. Morford, Southern Pines, NC (US); Matthew Girlando, Munich (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 11/084,660

(22) Filed: Mar. 18, 2005

(65) Prior Publication Data

US 2005/0161303 A1    Jul. 28, 2005

Related U.S. Application Data

(62) Division of application No. 10/094,186, filed on Mar. 8, 2002, now Pat. No. 6,886,674.

(51) Int. Cl.
    *F16D 13/69* (2006.01)
(52) U.S. Cl. .................. 192/70.28; 192/70.3; 192/101
(58) Field of Classification Search ............ 192/70.21, 192/70.28, 70.29, 70.3, 101
See application file for complete search history.

(56) References Cited

U.S. PATENT DOCUMENTS

| | | | | |
|---|---|---|---|---|
| 2,402,527 A | * | 6/1946 | Baird et al. | 192/70.28 |
| 2,600,520 A | | 6/1952 | Spase | |
| 3,174,602 A | | 3/1965 | Schjolin | |
| 4,257,502 A | * | 3/1981 | Riese | 192/70.25 |
| 4,431,097 A | * | 2/1984 | Scheer | 192/70.18 |
| 6,070,708 A | | 6/2000 | Fukuda et al. | |

FOREIGN PATENT DOCUMENTS

| | | | |
|---|---|---|---|
| EP | 0126188 A2 | * | 11/1984 |
| GB | 2 103 312 | | 2/1983 |
| JP | 55060728 | | 5/1980 |
| JP | 04258527 | | 9/1992 |

* cited by examiner

*Primary Examiner*—Richard M. Lorence
(74) *Attorney, Agent, or Firm*—Cohen, Pontani, Lieberman & Pavane

(57) ABSTRACT

A clutch assembly includes a clutch cover which can be secured to a flywheel; an intermediate plate spaced from the flywheel; a pressure plate arranged between the clutch cover and the intermediate plate and secured to the clutch cover by resilient straps which urge the pressure plate from an engaged position to a disengaged position; a first friction disk arranged between the pressure plate and the intermediate plate; and a second friction disk arranged between the intermediate plate and the flywheel. Linkage urges the intermediate plate toward the pressure plate so that the second friction disk can be fully disengaged from the flywheel when the pressure plate is retracted during disengagement.

8 Claims, 4 Drawing Sheets

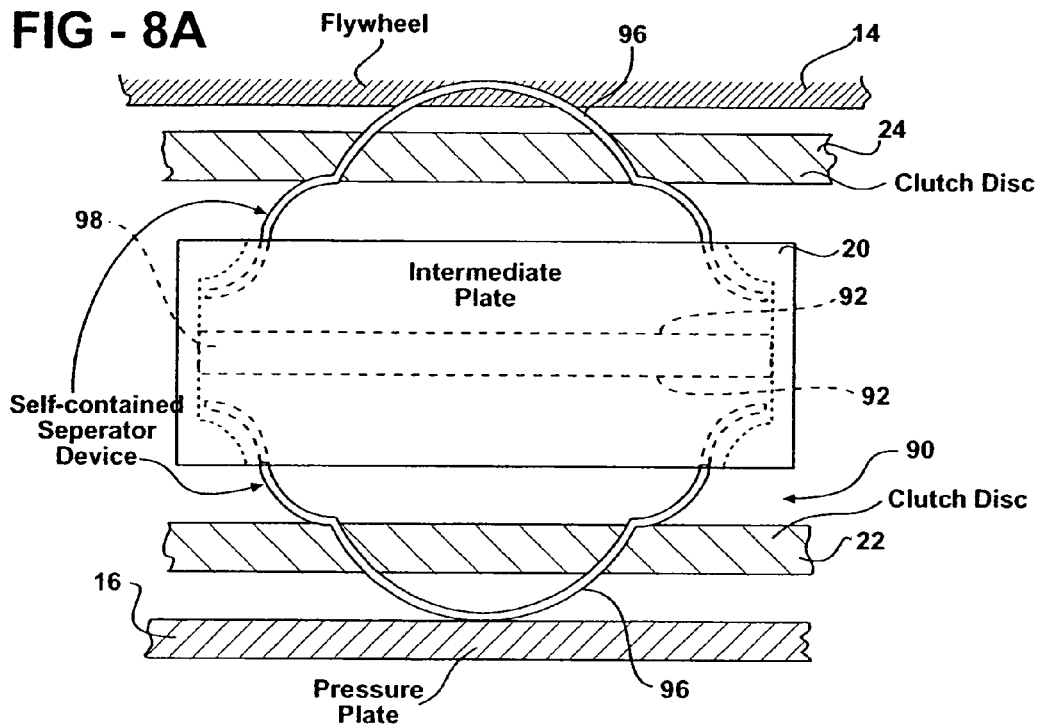
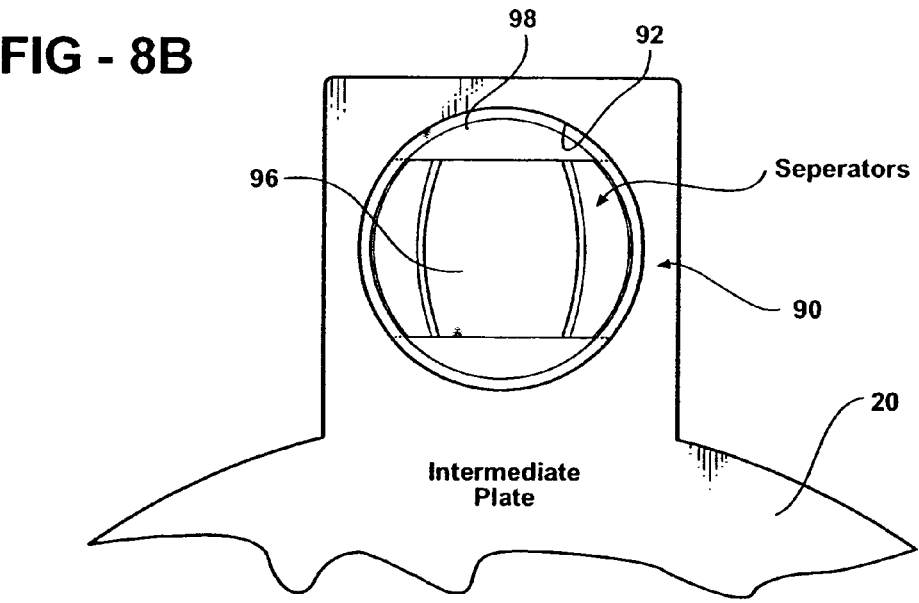

POSITIVE SEPARATOR FOR MULTIPLE DISC CLUTCHES

CROSS-REFERENCE TO RELATED APPLICATION

This is a division of application Ser. No. 10/094,186 filed Mar. 8, 2002, issued as U.S. Pat. No. 6,886,674 on May 3, 2005.

BACKGROUND OF THE INVENTION

This invention relates to a clutch typically used in coupling an engine and transmission, and more particularly, the invention relates to a multiple disc clutch.

Clutches typically include a clutch cover secured to a flywheel. A pressure plate is arranged between the clutch cover and the flywheel and forces a friction disc, which is arranged between the pressure plate and flywheel, into engagement with the flywheel to couple the engine and transmission together. Typically, a resilient member such as clutch straps interconnect the pressure plate and clutch cover together for rotation with one another. The clutch straps permit movement along the axis of rotation of the clutch to permit movement of the pressure plate relative to the clutch cover. The clutch straps retract the pressure plate away from the flywheel upon actuation of a clutch pedal, which creates a condition that permits self-disengagement of the friction disc from the plate and flywheel.

Multiple disc clutches include an intermediate plate arranged between the pressure plate and the flywheel. A friction disc is arranged between the pressure plate and the intermediate plate and another friction disc is arranged between the intermediate plate and the flywheel. Of course, additional pressure plates and friction discs may be used. As with single disc clutches, the clutch straps or other such device retracts the pressure plate from the flywheel to disengage the clutch. The friction discs and the intermediate plate are expected to self-disengage once the pressure plate has been retracted. However, due to the number of components, weight of the components, frictional forces between the components, and other factors, the intermediate plate and friction disc may not fully disengage from the plates and flywheel. As a result, the friction discs and intermediate plate may vibrate causing noise or drag against the flywheel resulting in parasitic losses. Therefore, what is needed is a multiple disc clutch assembly that permits self-disengagement of the friction discs to reduce and/or eliminate vibrations and parasitic losses.

SUMMARY OF THE INVENTION AND ADVANTAGES

The present invention provides a clutch assembly including a flywheel. A clutch cover is secured to the flywheel. An intermediate plate is spaced from the flywheel, and a pressure plate is arranged between the clutch cover and the intermediate plate. The intermediate plate may be secured to the clutch cover by flexible straps or another similar device. The straps retract the pressure plate from an engaged position to a disengaged position. First and second friction discs are respectively arranged between the pressure plate and the intermediate plate and between the intermediate plate and the flywheel. The pressure plate forces the intermediate plate and the friction discs toward the flywheel to couple the engine and transmission together. Additional plates and friction discs may be employed. The present invention utilizes a separator to move the intermediate plate with the pressure plate from the engaged position to the disengaged position thereby permitting self-disengagement of the friction discs from the flywheel. That is the separator maintains a gap between the plates and flywheel sufficient for self disengagement of the discs. The separator may include spaced apart portions with one of the portions engaging the pressure plate and the other of the portions engaging either the clutch cover or the flywheel. The separator includes an intermediate portion supported by the intermediate plate. The separator urges the intermediate plate in a direction toward the pressure plate, and preferably centers the intermediate plate between the pressure plate and the flywheel to permit sufficient space for the friction discs to self-disengage from the plates and flywheel.

Accordingly, the above invention provides a multiple disc clutch assembly that permits self-disengagement of the friction discs to reduce and/or eliminate vibrations and parasitic losses.

BRIEF DESCRIPTION OF THE DRAWINGS

Other advantages of the present invention can be understood by reference to the following detailed description when considered in connection with the accompanying drawings wherein:

FIG. 8A is a cross-sectional view of the clutch assembly similar to that depicted in FIG. 7; and FIG. 8B is a top elevational view of the separator shown in FIG. 8A.

DETAILED DESCRIPTION OF THE PREFERRED EMBODIMENT

Figure 1:
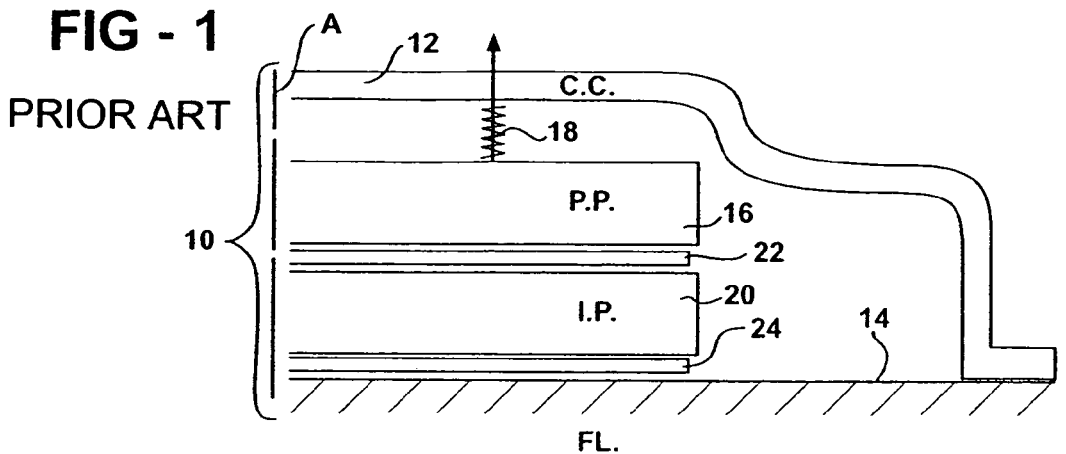
FIG. 1 is a cross-sectional view of a clutch assembly schematically depicting the clutch straps retracting the pressure plate to the disengaged position.

A clutch assembly 10 is shown schematically in FIG. 1. The clutch assembly 10 includes a clutch cover 12 secured to a flywheel 14 for rotation with the flywheel 14 about a rotational axis A. A pressure plate 16 is disposed within the clutch cover 12 and is secured to the clutch cover 12 for rotation with the cover 12 by straps 18. The straps 18 are flexible and permit the pressure plate 16 to move along the axis A relative to the clutch cover between an engaged position to a disengaged position in which the pressure plate is spaced from the flywheel 14 farther than in the engaged position. For a multiple disc clutch, an intermediate plate 20 is arranged between the pressure plate 16 and the flywheel 14. A first friction disc 22 is arranged between the pressure plate 16 and the intermediate plate 20 and a second friction disc 24 is arranged between the intermediate plate 20 and the flywheel 14.

The pressure plate 16 may be urged toward the flywheel 14 by a diaphragm and levers to force the pressure plate 16, intermediate plate 20, and friction discs 22 and 24, and flywheel 14 into engagement with one another. When in the engaged position, torque is transmitted from the engine flywheel 14 to the transmission through the friction discs 22 and 24.

The force applied by the diaphragm spring and levers may be released upon actuation of the clutch pedal to permit the straps 18 to retract the pressure plate 16 from the engaged position to a disengaged position. In the disengaged position the pressure plate 16 is retracted from the flywheel 14 to a position farther from the flywheel 14 then in the engaged position. The space between the pressure plate 16 and the flywheel 14 is theoretically sufficient to permit the intermediate plate 20 and friction discs 22 and 24 to self-disengage from the flywheel 14. However, self-disengagement may not occur due to the weight, size, friction between components, and vibrations of the intermediate plate 20 and friction discs 22 and 24. As a result, noise and parasitic losses may occur.

The present invention addresses the problem by retracting the intermediate plate 20 with the pressure plate 16 to enhance self-disengagement of the second friction disc 24 from the flywheel 14. Retraction of the intermediate plate 20 ensures that sufficient space is provided between the plates 16 and 20 and the flywheel 14 for the friction disc 22 and 24 to disengage from the plates 16 and 20 and flywheel 14. To this end, the invention employs a separator 28 to move the intermediate plate 20 away from the flywheel 14 as the pressure plate 16 is moved to the disengaged position. The separator 28 may include spaced apart portions engaging the pressure plate 16 and either the clutch cover or the flywheel. An intermediate portion between the opposing separation portions is supported by the intermediate plate to ensure that the intermediate plate 20 is retracted with the pressure plate 16 upon disengagement of the clutch. Preferably, the intermediate plate 20 is retracted to a position that is equidistant from the pressure plate 16 and the flywheel 14. The separator is compressed during engagement of the clutch to accommodate friction discs 22 and 24 of similar thickness.

Figure 2:
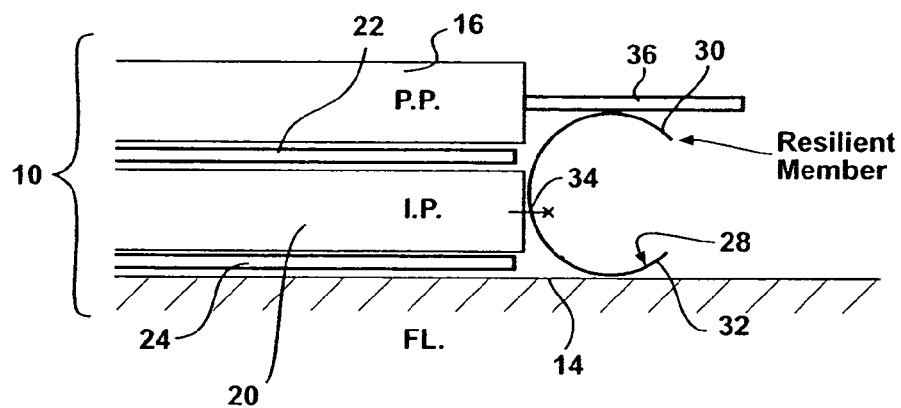
FIG. 2 is a cross-sectional view of a clutch assembly depicting the present invention separator.

Referring to FIG. 2, the separator 28 may be a C-shaped resilient member with an intermediate portion 34 secured to the intermediate plate 20, and a pair of opposing arm portions 30, 32 extending radially outward from the intermediate portion 34. One opposing arm portion 30 is loaded against a flange 36 extending radially from the pressure plate 16 and the other arm portion 32 is loaded against the flywheel 14.

Figure 3:
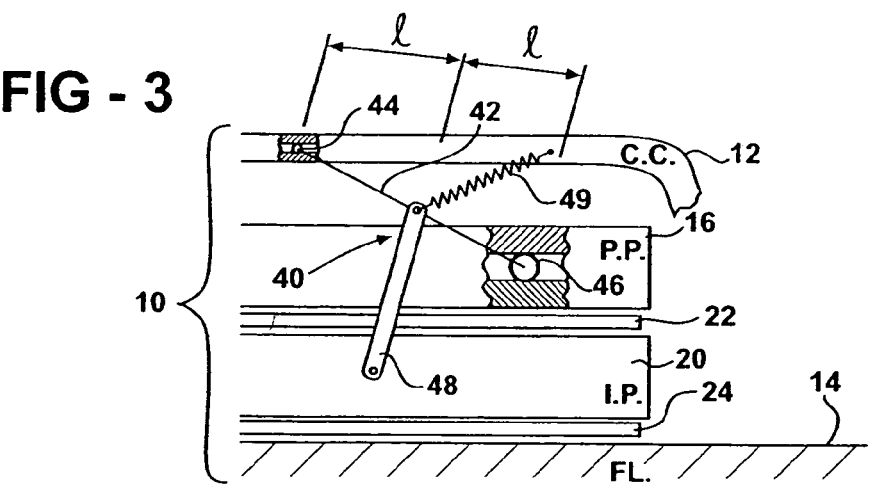
FIG. 3 is a cross-sectional view of the clutch assembly depicting another separator.

Referring to FIGS. 3–6, a linkage system may be employed to retract the intermediate plate 20. A separator 40 may include a link 42 having a first portion 44 slidably received within the clutch cover 12 and a second portion 46 slidably received within the pressure plate 16, as shown in FIG. 3. A link 48 is pivotally connected between the link 42 and the intermediate plate 20. The link 48 is connected to the link 42 at a position equidistant, spaced a distance 1, from the pressure plate 16 and clutch cover 12. A spring 49 is connected to the links 42 and 48 and the clutch cover 12 to bias the pressure plate 16 and intermediate 20 upward away from the flywheel 14.

Figure 4:
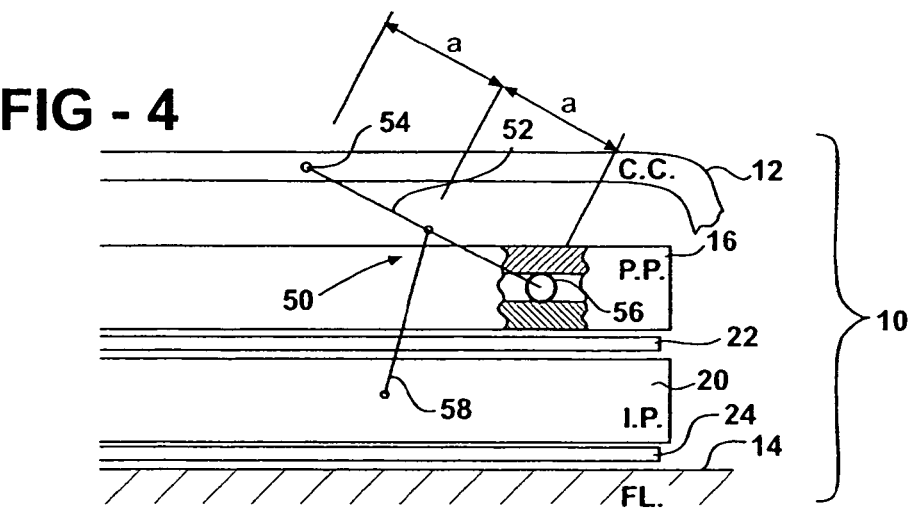
FIG. 4 is a cross-sectional view of a separator similar to that depicted in FIG. 3.

As shown in FIG. 4, separator 50 may include a link 52 with a first portion 54 pivotally fixed to the clutch cover 12 and a second portion 56 slidably received within the pressure plate 16. A link 58 is pivotally secured to the middle of the link 52 and to the intermediate plate 20. The link 52 is connected to link 58 a distance a from the pressure plate 16 and cover 12.

Figure 5:
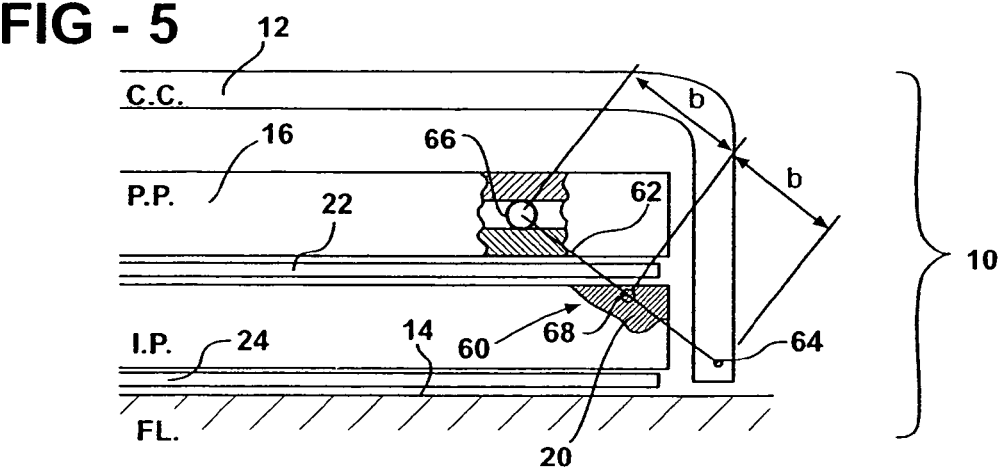
FIG. 5 is a cross-sectional view of the clutch assembly depicting yet another separator.
Figure 6:
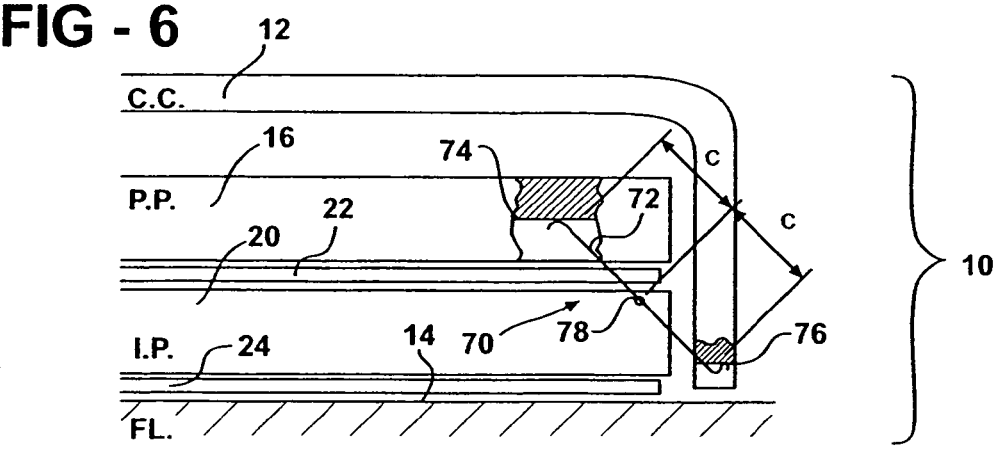
FIG. 6 is a cross-sectional view of the clutch assembly depicting a separator similar to that depicted in FIG. 5.

As shown in FIG. 5, a separator 60 may include a link 62 having a first portion 64 pivotally fixed to the clutch cover 12 and a second portion 66 slidably received within the pressure plate 16. An intermediate portion of the link 62 is pivotably connected to the intermediate plate 20 at connection 68. Referring to FIG. 6, a separator 70 includes a link 72 with a first portion 74 reacting against a pressure plate 16 and a second portion 76 reacting against the clutch cover 12. The link 72 is connected to the intermediate plate 20 at connection 78, which is rotationally fixed relative to intermediate plate 20.

Figure 7:
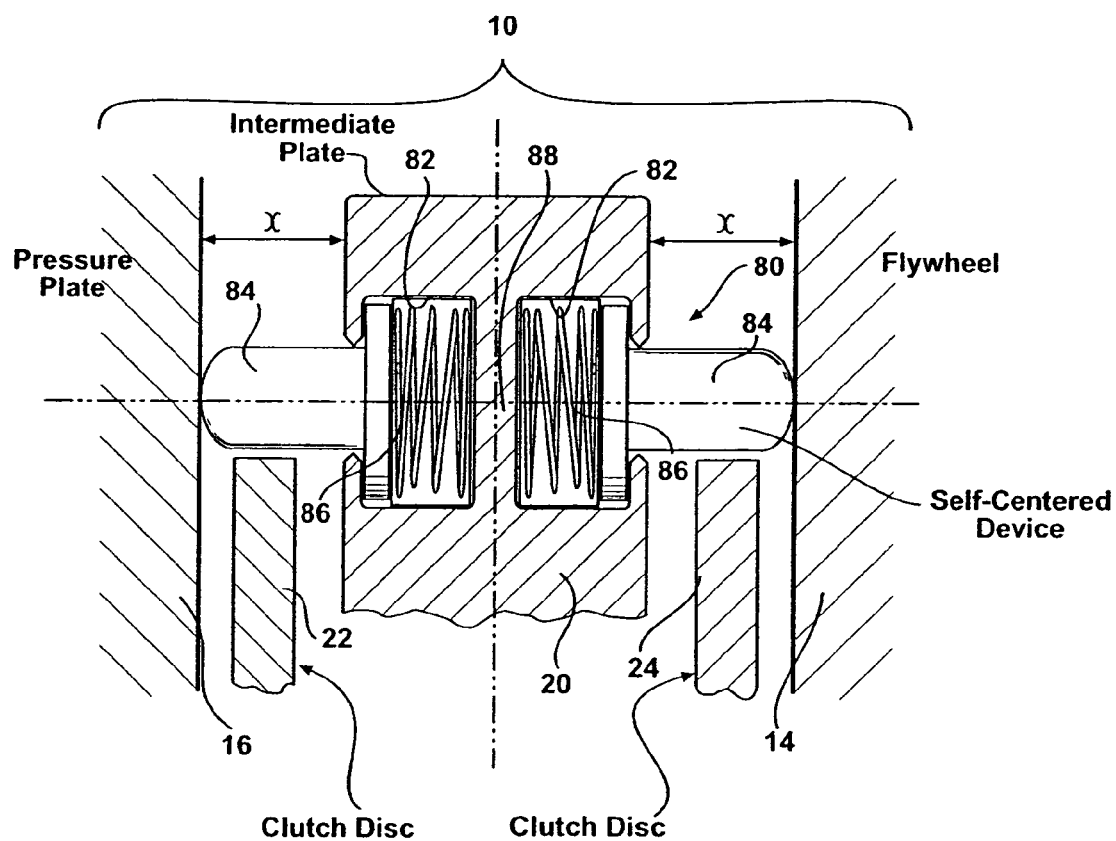
FIG. 7 is a cross-sectional view of the clutch assembly with still another separator.

The intermediate plate 20 may include a separator 80, as shown in FIG. 7. The intermediate plate 70 may include pockets 82 receiving pins 84 that include flanges to retain the pins 84 within the pockets 82. Resilient members 86 are arranged between the pins 84 and an intermediate wall 88 separating opposing pockets 82 to bias the pins 84 outward. Referring to FIGS. 8A and 8B, a separator 90 may include pockets 92 in a flange 94. Resilient bands 96 are received within the pockets and include ends bent outward to retain the resilient bands within the pockets 92. The resilient bands 96 react against an intermediate wall 98 separating opposing pockets 92 and coact with the pressure plate 16 and flywheel 14 to center the intermediate plate 20 between them.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A clutch assembly comprising:
   a clutch cover which can be secured to a flywheel;
   an intermediate plate spaced from the flywheel;
   a pressure plate arranged between the clutch cover and the intermediate plate and secured to the clutch cover so that the pressure plate is urged from an engaged position to a disengaged position;
   a first friction disk arranged between the pressure plate and the intermediate plate;
   a second friction disk arranged between the intermediate plate and the flywheel; and
   linkage urging the intermediate plate toward the pressure plate so that the second friction disk can be fully disengaged from the flywheel,
   wherein the linkage comprises a first link having a first end pivotably connected to the clutch cover, a second end pivotably connected to the pressure plate, and an intermediate portion, wherein the linkage further comprises a second link having a first end pivotably connected to the intermediate plate and a second end pivotably connected to the intermediate portion of the first link.

2. The clutch assembly of claim 1, wherein the second end of the first link is slidably connected to the pressure plate.

3. The clutch assembly of claim 1, wherein the first end of the first link is slidably connected to the clutch cover.

4. The clutch assembly of claim 3, further comprising a tension spring connecting the intermediate portion of the first link to the clutch cover.

5. The clutch assembly of claim 1, wherein the first end of the first link is slidably connected to the clutch cover, and the second end of the first link is slidably connected to the pressure plate.

6. A clutch assembly comprising:
   a clutch cover which can be secured to a flywheel;

an intermediate plate spaced from the flywheel;

a pressure plate arranged between the clutch cover and the intermediate plate and secured to the clutch cover so that the pressure plate is urged from an engaged position to a disengaged position;

a first friction disk arranged between the pressure plate and the intermediate plate;

a second friction disk arranged between the intermediate plate and the flywheel; and linkage urging the intermediate plate toward the pressure plate so that the second friction disk can be fully disengaged from the flywheel, wherein the linkage comprises a first link having a first end resiliently loaded against the clutch cover, a second end resiliently loaded against the pressure plate, and an intermediate portion mounted directly on the intermediate plate, wherein the intermediate portion of the first link is fixed against rotation relative to the intermediate plate.

7. The clutch assembly of claim 4, further comprising resilient straps arranged between the clutch cover and the intermediate plate, the straps urging the pressure plate toward the clutch cover.

8. The clutch assembly of claim 6, wherein the second end of the first link is slidably connected to the pressure plate.

* * * * *